United States Patent
Park et al.

(10) Patent No.: US 10,501,112 B2
(45) Date of Patent: Dec. 10, 2019

(54) STEERING SYSTEM WITH ACTIVE COMPENSATION FOR ROAD DISTURBANCES

(71) Applicant: Ford Global Technologies, LLC, Dearborn, MI (US)

(72) Inventors: Joseph Park, St. Clair Shores, MI (US); Jan Bremkens, Straelen (DE); Lodewijk Wijffels, Canton, MI (US); Oliver Nehls, Düsseldorf (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 265 days.

(21) Appl. No.: 15/351,215

(22) Filed: Nov. 14, 2016

(65) Prior Publication Data
US 2018/0134312 A1   May 17, 2018

(51) Int. Cl.
*B62D 5/00* (2006.01)
*B62D 5/04* (2006.01)

(52) U.S. Cl.
CPC ........... *B62D 5/008* (2013.01); *B62D 5/0472* (2013.01)

(58) Field of Classification Search
CPC .............................. B62D 5/008; B62D 5/0472
See application file for complete search history.

(56) References Cited

U.S. PATENT DOCUMENTS

| | | | |
|---|---|---|---|
| 5,828,972 A * | 10/1998 | Asanuma | B62D 5/006 701/41 |
| 6,085,860 A | 7/2000 | Hackl | |
| 6,148,943 A * | 11/2000 | Kodaka | B60T 7/22 180/169 |
| 6,728,615 B1 * | 4/2004 | Yao | B62D 6/008 180/402 |
| 6,886,656 B2 * | 5/2005 | Fujioka | B62D 5/006 180/402 |
| 6,945,353 B2 | 9/2005 | Bishop | |
| 7,092,805 B2 * | 8/2006 | Kasahara | B62D 5/006 180/446 |
| 7,233,850 B2 * | 6/2007 | Nakano | B60C 23/00 180/234 |

(Continued)

FOREIGN PATENT DOCUMENTS

| | | |
|---|---|---|
| CN | 101870302 A | 10/2010 |
| CN | 102632921 A | 8/2012 |
| KR | 20150077813 A | 7/2015 |

*Primary Examiner* — Frederick M Brushaber
(74) *Attorney, Agent, or Firm* — David R. Stevens; Stevens Law Group

(57) ABSTRACT

A vehicle includes an adaptive front steering system including an assist motor that provides an overlay angle superimposed on a steering wheel angle. External torque to the assist motor is estimated by a controller and evaluated to determine whether it is the result of an external disturbance. If so, the controller evaluates whether the external disturbance is a road disturbance, such as by determining that road wheel speed varied from the vehicle speed or that an impact site is present in outputs of external sensors of the vehicle. If a road disturbance is determined to have occurred, compliance may be introduced in order to reduce the transmission of torque to the steering wheel. Compliance may be introduced by adjusting current to the assist motor, a target angle to the assist motor, reducing gain in the control system for the assist motor, or shorting leads of the assist motor.

20 Claims, 5 Drawing Sheets

(56) References Cited

U.S. PATENT DOCUMENTS

| | | | |
|---|---|---|---|
| 7,891,460 B2 | 2/2011 | Kim | |
| 8,073,593 B2 * | 12/2011 | Mikamo | B62D 6/003 |
| | | | 180/170 |
| 8,560,176 B2 * | 10/2013 | Benyo | B62D 5/0457 |
| | | | 701/41 |
| 9,211,911 B2 * | 12/2015 | Stahlin | B62D 6/003 |
| 2003/0055545 A1 * | 3/2003 | Uenuma | B62D 6/008 |
| | | | 701/41 |
| 2004/0040781 A1 * | 3/2004 | Fujioka | B62D 5/006 |
| | | | 180/446 |
| 2004/0138796 A1 * | 7/2004 | Yao | B62D 5/001 |
| | | | 701/41 |
| 2005/0016791 A1 * | 1/2005 | Fukushima | B62D 5/008 |
| | | | 180/446 |
| 2005/0209752 A1 * | 9/2005 | Ono | B62D 5/008 |
| | | | 701/41 |
| 2006/0080016 A1 * | 4/2006 | Kasahara | B62D 5/006 |
| | | | 701/41 |
| 2006/0103511 A1 * | 5/2006 | Lee | B62D 5/008 |
| | | | 340/431 |
| 2008/0097670 A1 * | 4/2008 | Ogawa | B62D 5/008 |
| | | | 701/42 |
| 2010/0125385 A1 * | 5/2010 | Ogawa | B62D 5/008 |
| | | | 701/31.4 |
| 2010/0126795 A1 * | 5/2010 | Tokunaga | B62D 5/0472 |
| | | | 180/446 |
| 2011/0184608 A1 * | 7/2011 | Benyo | B62D 5/0457 |
| | | | 701/41 |
| 2013/0229524 A1 * | 9/2013 | Vovkushevsky | B60R 1/00 |
| | | | 348/148 |
| 2013/0245890 A1 * | 9/2013 | Kageyama | B62D 7/18 |
| | | | 701/41 |
| 2016/0129935 A1 * | 5/2016 | Akatsuka | B62D 5/0463 |
| | | | 180/446 |
| 2016/0185292 A1 * | 6/2016 | Asai | B60R 1/00 |
| | | | 348/148 |
| 2017/0050524 A1 * | 2/2017 | Imai | B60L 3/0084 |
| 2017/0217478 A1 * | 8/2017 | Maguire | B62D 5/0463 |
| 2017/0278395 A1 * | 9/2017 | Hamada | G08G 1/0962 |
| 2017/0341648 A1 * | 11/2017 | Sanma | B60N 3/06 |
| 2018/0009444 A1 * | 1/2018 | Grimm | G05B 23/0229 |

* cited by examiner

STEERING SYSTEM WITH ACTIVE COMPENSATION FOR ROAD DISTURBANCES

BACKGROUND

Field of the Invention

This invention relates to power steering systems and, more particularly to adaptive power steering systems.

Background of the Invention

Active steering systems may continuously and intelligently alter the relationship between a driver's steering inputs at the steering wheel and the angle of the steered road wheels (i.e., the road wheel angle (RWA)) of the vehicle. An active steering system, for example, varies the degree that the road wheels turn in response to rotation of the steering wheel via a mechatronic auxiliary system. At lower speeds, this technology may reduce the amount that the steering wheel must be turned (improving performance in situations such as parking and other urban area traffic maneuvers), and at higher speeds, the system helps to prevent increased steering responsiveness resulting from increased speeds (providing improved direction stability).

Examples of active steering systems include, but are not limited to, a steer-by-wire system, in which there is no mechanical connection between the steering wheel and the steering of the road wheels, and a superimposed steering system, in which the steering angle that is generated at the steering wheel by the driver is superimposed on a steering angle generated by a servo motor, in a superimposition gear mechanism, and the sum of the two steering angles is transmitted to the steering of the road wheels. Such active steering systems provide various advantages, including, for example, the ability to change the angle of the steered road wheels without the intervention being directly perceptible to the driver.

The system and methods disclosed herein provide an improved approach for implementing an active steering system in order to deal with road disturbances that may transmit torque to the driver's hands.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents.

An active steering system, such as, for example, Active Front Steering (AFS) provides an electronically controlled superimposition of an angle to the steering wheel angle provided by the driver of the vehicle. The amount of this superimposed angle ("hereinafter the superimposition angle") is determined by the AFS system based on the steering state of the steering system.

As used herein, the "steering state" refers to some or all of the steering wheel angle, steering wheel rotational direction, steering wheel angle rate of change, road wheel angle, road wheel angle rate of change, vehicle speed, vehicle acceleration, vehicle lateral acceleration, and yaw rate at a particular point in time (i.e., the steering situation created by the driver of the vehicle at a given point in time).

Various exemplary embodiments of the present disclosure contemplate using various vehicle sensors to provide signals to a controller, and the controller then utilizes the signals to both determine the steering state and to detect and counter disturbances. The vehicle sensors may include existing vehicle sensors when available, such as, for example, active steering sensors, such as, for example AFS sensor(s), antilock brake system (ABS) sensor(s), steering wheel angle sensors, steering wheel velocity sensors, wheel speed sensors, vehicle speed sensors, and an actuator angle sensor, a pinion angle sensor, or any combination thereof. Because most existing vehicles already contain the above sensors, certain embodiments of the present disclosure contemplate using only existing vehicle sensors. Embodiments of the present disclosure also contemplate systems and methods that include and utilize additional sensors as needed to provide the signal inputs used in the systems and methods of the present disclosure.

Figure 1:
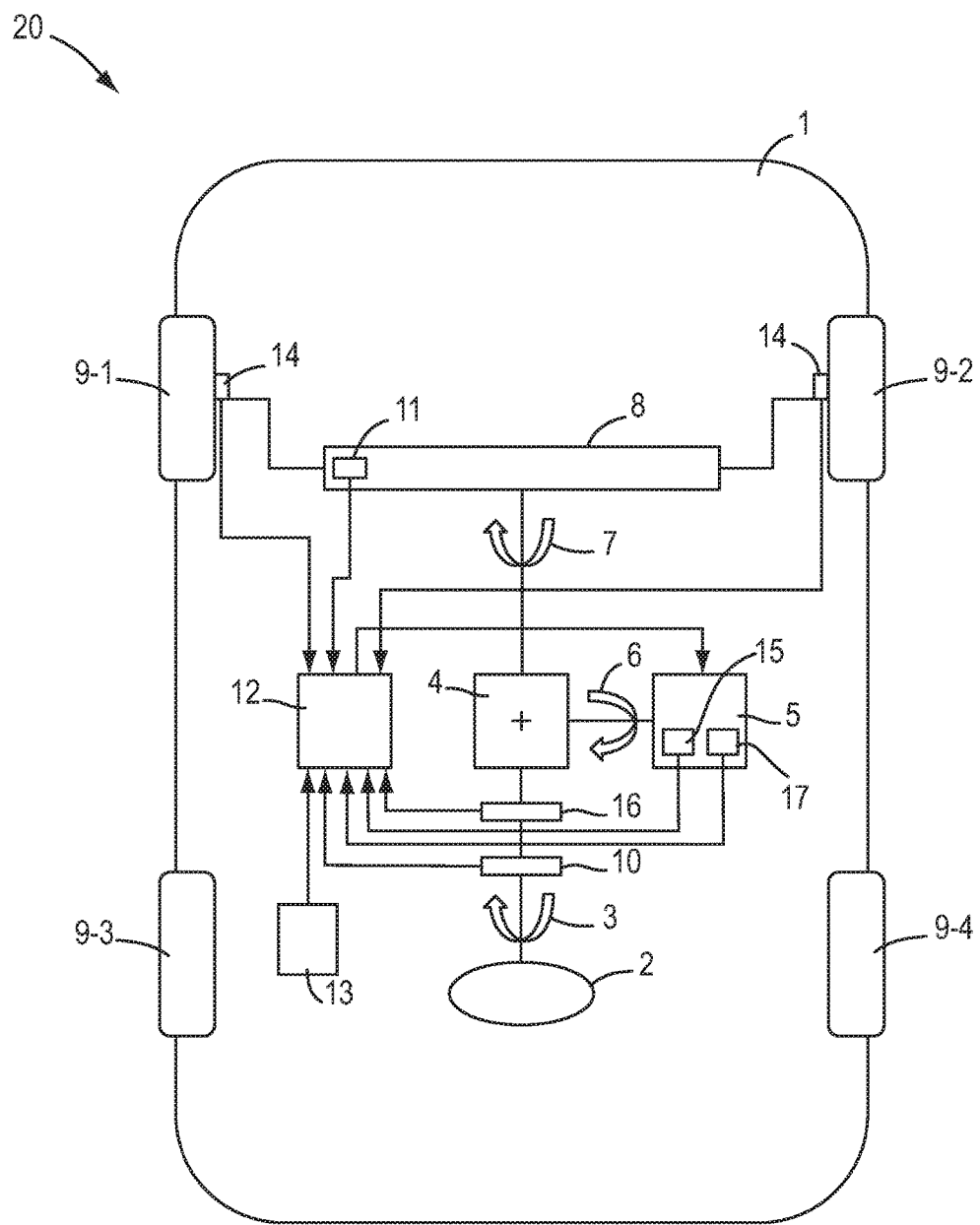
FIG. 1 is a schematic diagram showing the structure of an exemplary embodiment of a system for correcting steering offsets in a vehicle in accordance with the present disclosure.

Turning now to the drawings, FIG. 1 shows the structure of an exemplary embodiment of a system 20 for correcting steering offsets in accordance with the present disclosure. A motor vehicle 1 includes an active steering system, such as, for example, an Active Front Steering (AFS) system (shown by individually labeled components). In use, a driver of the motor vehicle 1 may control the direction of motion of the motor vehicle 1 via a steering wheel 2, thereby deflecting (i.e., turning) the steering wheel 2 by an amount equal to a steering wheel angle 3. The AFS system, may include, for example, a superimposition gear mechanism 4, which superimposes a superimposition angle 6 (i.e., an overlay angle 6) on the steering wheel angle 3 via an actuator, such as, for example, an electric motor 5. A resulting compensated steering angle 7, which includes the steering wheel angle 3 and the superimposition angle 6, moves a steering gear 8, which moves two of the wheels 9-1, 9-2, 9-3, 9-4 into a desired position (i.e., the desired RWA). As shown in the embodiment of FIG. 1, in a vehicle having front axle steering, the compensated steering angle 7 will cause the steering gear 8 to move the front wheels 9-1, 9-2 (i.e., the steered road wheels) of the vehicle 1. The steering gear 8 may include an assist motor or hydraulic system that provides assistance to change the angle of the road wheels 9-1, 9-2 in accordance with the compensated steering angle 7.

In various embodiments of the present disclosure, the system 20 may include one or more preexisting vehicle sensors embodied within various subsystems of the vehicle 1, and a controller 12 that is configured to receive signals from the sensors, determine a steering state based on the signals.

In various embodiments, for example, the active steering system includes a steering wheel angle sensor 10 that may detect the steering wheel angle 3 for determination of a desired road wheel angle (RWA). In particular, the active steering system superimposes an angle on the steering wheel angle 3 in order to achieve a desired RWA as known in the art.

The system 20 may further include various additional sensors used to detect and compensate for road disturbances. For example, an actuator angle sensor 15 may detect the superimposition angle 6 provided by the electric motor 5. The sensors may further include a pinion angle sensor 11, a vehicle speed sensor 13, wheel speed sensors 14 associated with each of the front wheels 9-1, 9-2 of the vehicle 1 and/or a steering wheel velocity sensor 16. Such sensors may be present in various additional subsystems of the vehicle 1, including, for example, the anti-lock braking system (ABS, not shown).

As described below, the torque generated by the electric motor 5 may be used in order to detect and compensate for external disturbances to steered wheels 9-1, 9-2. In some embodiments, torque may be estimated from current through the motor 5. Accordingly, a current sensor 17 may measure this current and provide an output indicating this current to the controller 12. The current sensor 17 may be housed within the electric motor 5 or be placed elsewhere within the vehicle 1.

Those of ordinary skill in the art will understand that the system 20 illustrated in FIG. 1 is exemplary only and intended to illustrate one embodiment of the present disclosure. Accordingly, systems and vehicles encompassing such systems in accordance with the present disclosure may have various types, numbers and/or configurations of actuators, controllers, and/or sensors without departing from the scope of the present disclosure and claims. For example, although the system 20 illustrated and described with reference to FIG. 1 includes an AFS system, embodiments of the present disclosure contemplate damping road disturbances in conjunction with any type and/or configuration of active steering system.

As shown in FIG. 1, the controller 12 receives signals from some or all of the steering wheel angle sensor 10, vehicle speed sensor 13, wheel speed sensors 14, actuator angle sensor 15, steering wheel velocity sensor 16, and current sensor 17. The controller 12 may include, for example, an existing vehicle controller such as the Electronic Control Unit (ECU) of the vehicle 1, or a dedicated controller, or control may be distributed among more than one vehicle controller, as would be understood by one ordinarily skilled in the art.

Figure 2:
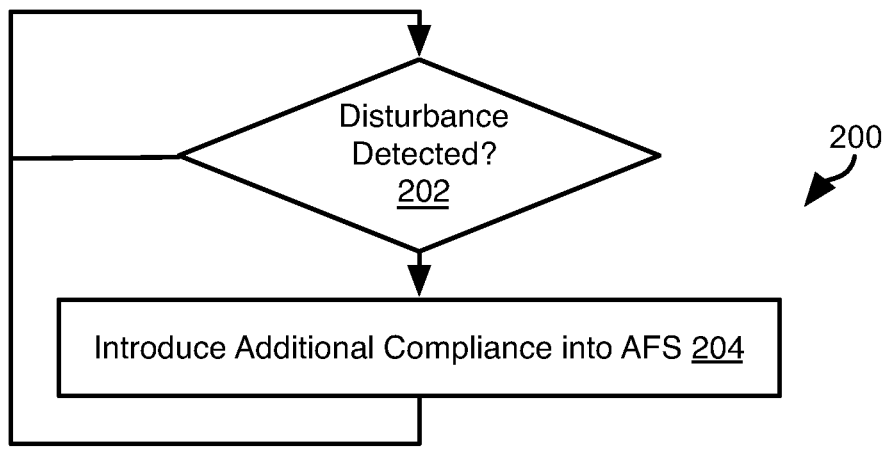
FIG. 2 is a process flow diagram of a method for compensating for road disturbances in accordance with an embodiment of the present invention.

Referring to FIG. 2, the illustrated method 200 illustrates a basic approach for reducing transmission of road disturbances to the steering wheel 2 and the driver's hands. In response to detecting 202 a disturbance from the road, such as from a pot hole, debris, curb, etc., additional compliance is introduced 204 into the system 20. In particular, inasmuch as there is a decoupling between the steering wheel 2 and the road wheels 9-1, 9-2, the superimposition angle 6 and torque provided by the electric motor 5 may be controlled in order to reduce the transmission of disturbances to the steering wheel 2.

The manner in which the road disturbances are detected 202 may be according to the methods of some or all of FIGS. 3 through 6.

Introducing 204 compliance may be performed in various ways. In one example, the controller 12 alters the target angle for the electric motor 5. For example, if the electric motor 5 is rotating clockwise and an external torque is detected that also causes a clockwise rotation, the controller may adjust the target angle for the motor 5 to require reduction in the clockwise rotation. In another example, if the motor 5 is rotating clockwise and a road disturbance is detected the causes counter-clockwise rotation, the controller may adjust the target angle for the motor 5 to require an increase in clockwise rotation.

In some embodiments, the controller 12 may introduce compliance by adjusting current to the motor 5. For example, where a road disturbance results in the motor 5 generating more torque to reach a target angle, e.g., the disturbance urges the road wheels in an opposite direction than the movement induced by motor torque, the current to the motor 5 may be increased. Where a disturbance results in the motor 5 generating less torque, e.g. urges the road wheels in a same direction as the motor torque, the current to the motor 5 may be decreased.

In yet another embodiment, inducing compliance may include reducing a gain of the controller 12 in response to a road disturbance thereby making the steering system more compliant. By doing this, the effect of spikes in torque due to road disturbance are reduced, but the vehicle 1 still follows the desired trajectory. In particular, the function by which the superimposition angle 6 is determined as a function of steering wheel angle 3 may be modified such that the superimposition angle 6 will be reduced in response to a detected road disturbance as compared to the superimposition angle 6 determined by the controller 12 in the absence of the detected road disturbance for a given steering state.

In yet another embodiment, damping of road disturbances may be achieved by shorting leads of the electric motor 5. In particular, for a three-phase motor, shorting the leads will result in damping of torque imposed on the motor 5 that increases with the speed at which the motor 5 is rotated.

In some embodiments, one or more of these approaches may be used according to different circumstances. For example, the controller 12 may select among one of the above approaches, or select a combination of two or more of the above approaches, according to a magnitude of a detected road disturbance.

Figure 3:
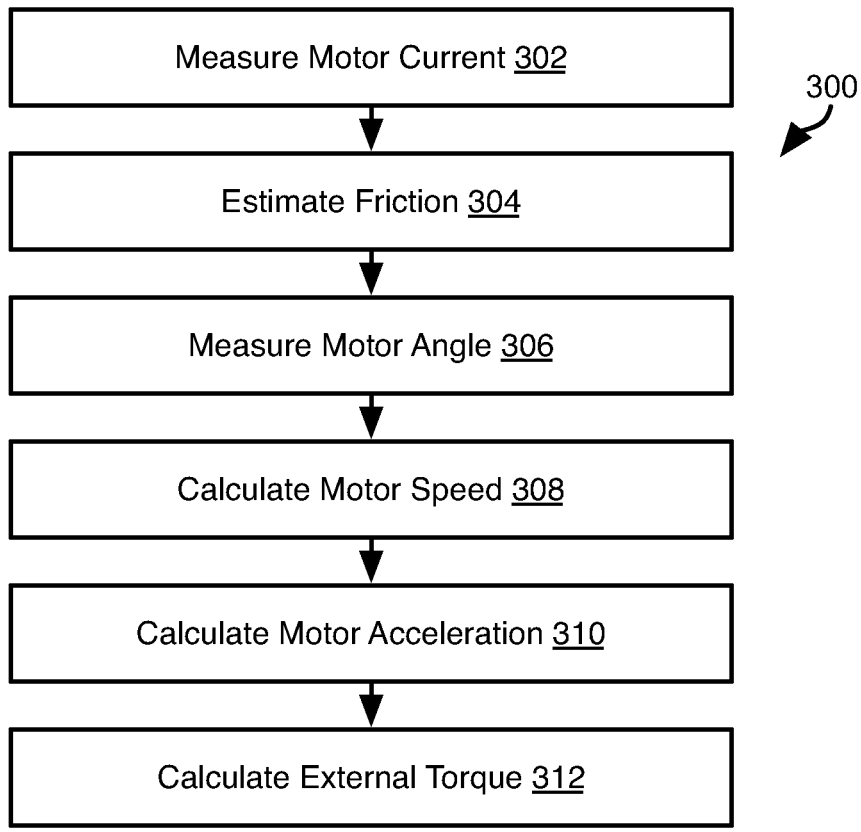
FIG. 3 is a process flow diagram of a method for measuring an external torque exerted on a steering system in accordance with an embodiment of the present invention.

Referring to FIG. 3, the illustrated method 300 may be used to estimate external torque exerted on the steering system 20, such as by detecting the external torque applied to the motor 5. In practice, the controller 12 controls the superimposition angle 6 by applying a torque to the motor 5, e.g. by supplying an amount of current or providing a torque control signal that instructs the motor to generate a given amount of torque. In some embodiments, the controller 12 calculates this torque as a function of a difference between an actual motor angle, a target motor angle (e.g. to achieve the desired superimposition angle), and motor speed. When an external torque is applied to the steering system 20, the difference between actual and target angle becomes larger till a torque equilibrium between external torque, motor torque, and motor acceleration is reached. As a result of this phenomenon, it is possible to estimate how large the external torque input is and also if the torque input is induced by the driver or the road wheels. The method 300 provides an approach for determining the external torque on the steering system 20. FIGS. 4 through 7 illustrate approaches for processing the external torque to determine whether it is caused by a road disturbance such that additional compliance should be induced in the steering system.

The method 300 may include measuring 302 current drawn by the electric motor 5, such as by using the current sensor 17 or some other means. The measured current may be used as an estimate of torque output by the motor. For example, the motor 5 may be measured under various loads and input currents to derive a function approximating torque as a function of input current and motor angular velocity. Speed of the motor 5 may be derived from outputs of the actuator angle sensor 15.

The method 300 may include estimating 304 friction. Friction is a generally constant force in the steering system 20. Accordingly, it may be determined experimentally for the steering system 20 for a variety of situations (vehicle speed, steering wheel angular velocity, steering wheel angle, etc.). An estimate of friction may then be obtained based on the current values for these parameters and the experimentally determined relationship between these parameters and friction. Alternatively, friction may be determined based on measures of current vehicle operating conditions.

Friction can, for example, be estimated by using a friction model (e.g. Coulomb model, Stribeck model). The parameters required for these models can either be estimated online or offline. Another way to estimate friction is to observe the system behavior during specific operating conditions, where the external torque is known (e.g. system start-up, End of line calibration).

The method 300 may further include measuring 306 an angular position of the electric motor 5, such as from an output of the actuator angle sensor 15. Outputs of the actuator angle sensor 15 over time may be used to calculate 308 the speed of the motor and calculate 310 its acceleration. Alternatively, one or more separate sensors may sense one or both of these values directly.

An external torque may then be calculated 312 according to the values determined at steps 302, 304, 308, and 310. For example, external torque may be calculated as:

$$T_E = I^* a_M + D^* W_M - T_F + T_M,$$

where $T_E$ is the external torque, I is the rotational inertia of the motor, $a_M$ is the acceleration of the motor, $W_M$ is the angular velocity of the motor, D represents the damping in the system (e.g., viscous friction), $T_F$ is the torque due to friction, the $T_M$ is the torque exerted by the motor 5 as estimated from motor current.

In some embodiments, a less precise estimate of external torque may be used that may still provide acceptable results. For example, friction and inertia may be ignored or the external torque may simply be approximated as the torque of the motor as estimated from the current drawn by the motor.

Figure 4:
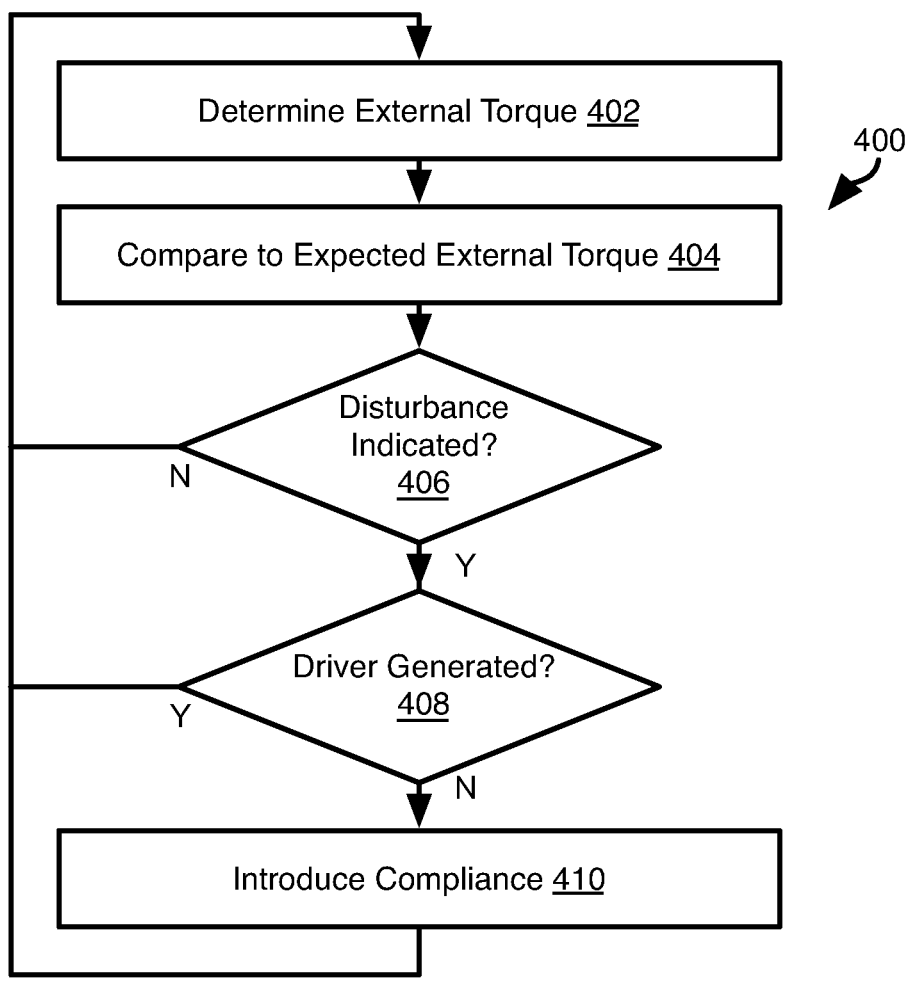
FIG. 4 is a process flow diagram of a method for identifying externally-caused disturbances in accordance with an embodiment of the present invention.

Referring to FIG. 4, the illustrated method 400 may be used to detect disturbances caused by impacts on the road wheels 9-1, 9-2. The method 400 may include determining 402 the external torque applied to the steering system 20 or the external torque as applied to the electric motor 5. For example, the external torque may be calculated according to the method 300 of FIG. 3.

The method 400 may further include comparing 404 the external torque to an expected external torque for the current steering state. Specifically, for a given steering state, the torque on the electric motor 5 may be consistent. For example, the torque exerted on the electric motor 5 by the steering wheel and the torque transmitted to the electric motor 5 from the road wheels 9-1, 9-2 for a given steering state may be known by experimental measurements under for a variety of steering states. For example, a curve fit outputting an approximate external torque as a function of some or all of these parameters defining the steering state may be determined.

The method 400 may include evaluating 406 whether the difference between the external torque of step 402 and the expected torque of step 404 indicate a disturbance. For example, if the external torque exceeds the expected torque by some threshold amount, which may be threshold dependent. At slow speeds, a driver often makes sharp turns of the steering wheel 2, whereas at high speeds adjustments are smaller and slower, since large movements would result in loss of control. Accordingly, the difference may be compared to a threshold amount that varies, e.g. decreases, based on velocity.

If step 406 indicates a disturbance, the method 400 may include evaluating 408 whether the disturbance was generated by the driver or by an impact to the road wheels 9-1, 9-2. Examples of methods for determining whether a disturbance is due to a road disturbance are described below with respect to FIGS. 5 through 7.

If the disturbance is not found 408 to be driver generated, the compliance is introduced 410 as described above with respect to step 204 of FIG. 2.

If no disturbance is indicated 406 or the disturbance is found 408 to be driver generated, then compliance is not introduced 410 and the AFS operates in a conventional manner. Likewise, if no disturbance is indicated 406 or the disturbance is found 408 to be driver generated, any compliance introduced 410 in a previous iteration of the method 400 may be removed. In some embodiments, the additional compliance may result in a deviation between a desired relationship between the road wheel angle and the steering wheel angle. Accordingly, this deviation may be reversed gradually in order to not affect the stability of the vehicle 1. Removing this deviation may include implementing the methods disclosed in U.S. application Ser. No. 14/558,427 filed Feb. 27, 2014, and entitled SYSTEMS AND METHODS FOR CORRECTING STEERING OFFSETS, which is hereby incorporated herein by reference in its entirety.

Figure 5:
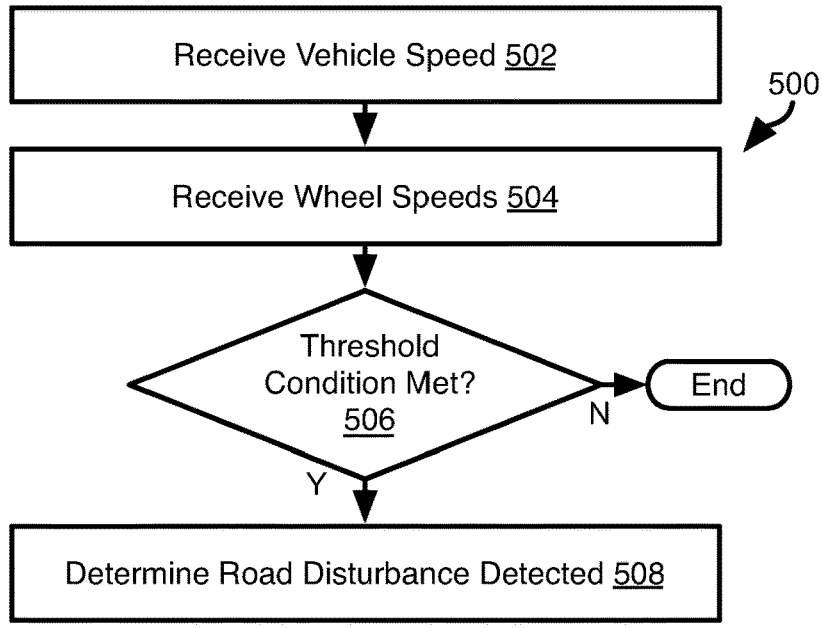
FIG. 5 is a process flow diagram of another method for identifying externally-caused disturbances in accordance with an embodiment of the present invention.
Figure 6:
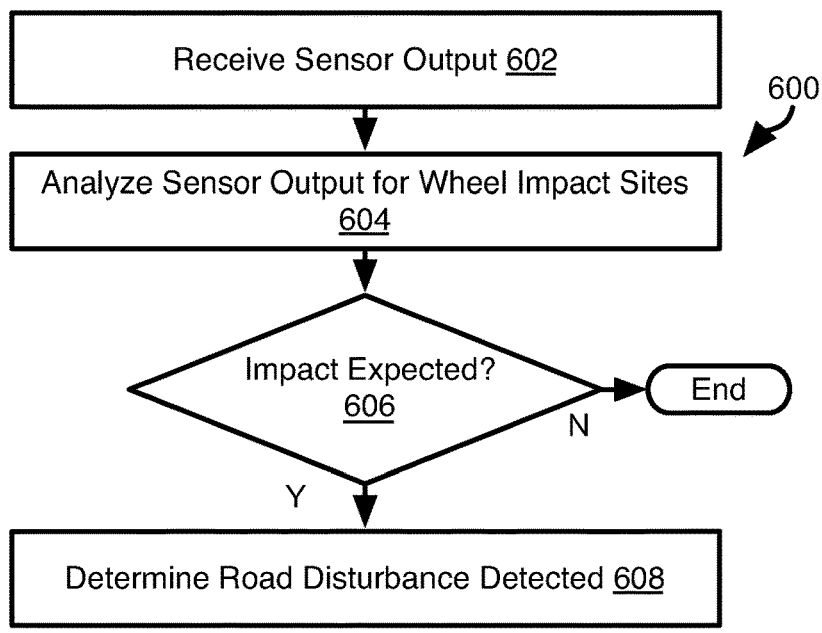
FIG. 6 is a process flow diagram of yet another method for identifying externally-caused disturbances in accordance with an embodiment of the present invention.
Figure 7:
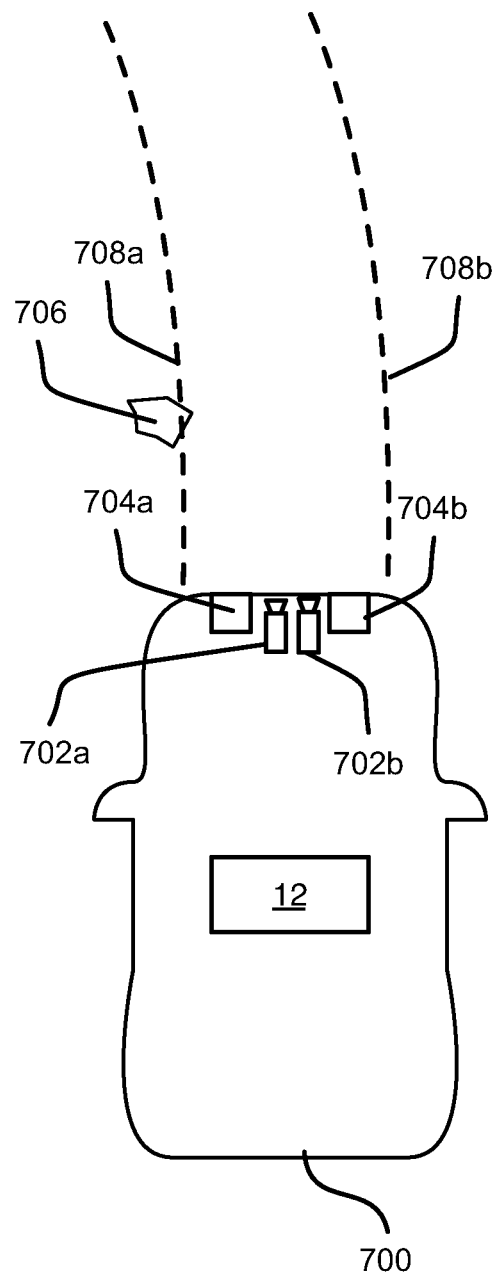
FIG. 7 is a schematic diagram illustrating a scenario in which potential road disturbances may be detected.

FIGS. 5 through 7 illustrate approaches for estimating whether a detected disturbance is driver generated or is the result of a road disturbance. The approaches of FIGS. 5 through 7 may be used separately or in combination. For example, if any one of the approaches of FIGS. 5 through 7 indicates a road disturbance rather than a driver input, a road disturbance may be determined to be occurring.

Referring specifically to FIG. 5, the illustrated method 500 may make use of signal outputs from sensors 14 mounted on or near the road-wheels 9-1, 9-2, such as on the steering knuckle. Sensors 14 may detect such parameters as wheel speed, steering knuckle acceleration (e.g., due to road impacts), or other parameters.

The method 500 may include receiving 502 the speed of the vehicle 1, such as from vehicle speed sensor 13 and receiving 504 wheel speeds for the road-wheels 9-1, 9-2 from the sensors 14. Step 504 may further include receiving an acceleration measurement from sensors 14, e.g. a vertical acceleration of the wheels 9-1, 9-2.

The method 500 may include evaluating 506 whether the speed of step 502 and sensor outputs of step 504 indicate slip. In particular, where the wheel speed of step 504 for one of the road wheels 9-1, 9-2 is slower or faster than the vehicle speed of step 502 by some threshold amount, then a road disturbance may be determined 508 to be indicated. Likewise, if the speed of one wheel is found 506 to differ from the speed of the other wheel by a threshold amount above that due to the current turning radius of the vehicle 1, then a road disturbance may be found 508 to be indicated. Where vertical acceleration of the road wheels 9-1, 9-2 is measured, a value of vertical acceleration in one or both wheels found 506 to be above a threshold may be determined 508 to indicate a road disturbance.

Referring to FIG. 6, while also referring to FIG. 7, a method 600 may include detecting road disturbances using one or more forward facing cameras 702a, 702b or other sensors 704a, 704b mounted to a vehicle 700 including the controller 12 and a steering system 20 as described above. For example, sensors 704a, 704b may include RADAR (radio detection and ranging) sensors, LIDAR (light detection and ranging) sensors, SONAR (sound navigation and ranging) sensors, ultrasonic sensors, and the like.

The method 600 may include receiving 602 outputs of the sensing devices 702a, 702b, 704a, 704b and analyzing 604 outputs of the sensing devices 702a, 702b, 704a, 704b for features indicating wheel impact sites. For example, the controller 12 may identify a ground plane in sensor data, holes or projections 706 in that ground plane. Holes or projections lying on the trajectories 708a, 708b of the road wheels 9-1, 9-2 may be identified during the analyzing steps 604. If a hole or projection 706 is identified that is found 606 to be likely to impact with the road wheels 9-1, 9-2, then a disturbance detected immediately following detection may be determined 608 to be a road disturbance, e.g. if detected within a threshold of a time required for the road wheels 9-1, 9-2 to arrive at the location of the detected hole or projection 706.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
   detecting, by a controller, an external disturbance to road wheels of a vehicle, the external disturbance being caused by at least one of a hole and a projection in a road driven over by the vehicle; and
   in response to detecting the external disturbance, adjusting power supplied to an assist motor coupling a steering wheel to the road wheels effective to reduce torque transmission from the road wheels to the steering wheel and increase compliance between the road wheels and the steering wheel such that a magnitude of torque transmitted from the road wheels to the steering wheel as a result of the external disturbance is reduced.

2. The method of claim 1, wherein introducing compliance comprises adjusting a target angle for the assist motor.

3. The method of claim 1, wherein introducing compliance comprises adjusting current to the assist motor.

4. The method of claim 1, wherein introducing compliance comprises reducing current to the assist motor.

5. The method of claim 1, wherein introducing compliance comprises shorting leads of the assist motor.

6. The method of claim 1, wherein detecting the external disturbance to the road wheels comprises:
   determining an external torque applied to the assist motor; and
   determining that the external torque is a result of an external disturbance.

7. The method of claim 6, wherein determining the external torque applied to the assist motor comprises calculating the external torque as a function of acceleration of the assist motor, rotational inertia of the assist motor, and speed of the assist motor and of friction in a steering system coupling the steering wheel to the road wheels.

8. The method of claim 7, wherein determining that the external torque is a result of an external disturbance comprises:
   determining that a speed of one or more of the road wheels is different from a vehicle speed.

9. The method of claim 7, wherein determining that the external torque is a result of an external disturbance comprises:
   determining that a torque output by the assist motor for a difference between an actual angle of the assist motor and a target angle determined by the controller is different from an expected torque output.

10. The method of claim 1, wherein detecting, by a controller, the external disturbance to the road wheels of the vehicle comprises:
    detecting an obstacle using a sensor mounted to the vehicle, the obstacle being located ahead of the vehicle; and
    determining that the obstacle lies on a trajectory of one of the road wheels.

11. A vehicle comprising:
    a steering wheel;
    a steering wheel sensor coupled to the steering wheel and configured to sense rotation of the steering wheel;
    road wheels mounted to the vehicle;
    a steering system coupling the steering wheel to the road wheels, the steering system including a superimposition gear mechanism engaging the steering wheel and the road wheels;
    an assist motor coupled to the superimposition gear mechanism, the assist motor configured to control a superimposition angle imposed by the superimposition gear mechanism;
    a controller coupled to the steering wheel sensor and the assist motor, the controller programmed to:
    control the superimposition angle imposed by the assist motor as a function of a steering angle of the steering wheel;
    detect an external disturbance to road wheels of a vehicle caused by one of a projection and a hole in a road; and
    in response to detecting the external disturbance, adjust power supplied to the assist motor effective to adjust the superimposition angle such that compliance between the road wheels and the steering wheel is increased and an amount of torque transmitted between the road wheels and the steering wheel as a result of the external disturbance is reduced.

12. The system of claim 11, wherein the controller is programmed to introduce compliance by adjusting a target angle for the assist motor.

13. The system of claim 11, wherein the controller is programmed to introduce compliance by adjusting current to the assist motor.

14. The system of claim 11, wherein the controller is programmed to introduce compliance by reducing current to the assist motor.

15. The system of claim 11, wherein the controller is programmed to introduce compliance by shorting leads of the assist motor.

16. The system of claim 11, wherein the controller is programmed to detect the external disturbance to the road wheels by:
   determining an external torque applied to the assist motor; and
   determining that the external torque is a result of an external disturbance.

17. The system of claim 16, wherein the controller is programmed to determine the external torque applied to the assist motor by calculating the external torque as a function of acceleration of the assist motor, rotational inertia of the assist motor, and speed of the assist motor and of friction in a steering system coupling the steering wheel to the road wheels.

18. The system of claim 17, wherein the controller is programmed to determine that the external torque is a result of an external disturbance by:
   determining that a speed of one or more of the road wheels is different from a vehicle speed.

19. The system of claim 17, wherein the controller is programmed to determine that the external torque is a result of an external disturbance by:
   determining that a torque output by the assist motor for a difference between an actual angle of the assist motor and a target angle determined by the controller is different from an expected torque output.

20. The system of claim 11, wherein the controller is programmed to detect the external disturbance to the road wheels of the vehicle by:
   detecting an obstacle using a sensor mounted to the vehicle, the sensor being at least one of a forward facing camera, a RADAR (radio detection and ranging) sensors, and a LIDAR (light detection and ranging) sensor; and
   determining that the obstacle lies on a trajectory of one of the road wheels.

* * * * *